United States Patent [19]

Steeg

[11] Patent Number: 4,493,409
[45] Date of Patent: Jan. 15, 1985

[54] FRICTION CLUTCH

[75] Inventor: Klaus Steeg, Bühl, Fed. Rep. of Germany

[73] Assignee: Luk Lamellen und Kupplungsbau GmbH, Bühl, Fed. Rep. of Germany

[21] Appl. No.: 340,390

[22] Filed: Jan. 18, 1982

Related U.S. Application Data

[63] Continuation of Ser. No. 116,945, Jan. 30, 1980, abandoned, which is a continuation-in-part of Ser. No. 847,805, Nov. 2, 1977, abandoned.

[51] Int. Cl.³ .............................................. F16D 65/00
[52] U.S. Cl. .............................. 192/115; 192/30 W; 192/70.13; 74/572
[58] Field of Search ............. 192/70.13, 30 W, 70.27, 192/66, 99 A, 109 R, 115, 112; 123/146.5 A, 117 R; 73/116, 117.2; 74/572

[56] References Cited

U.S. PATENT DOCUMENTS

| | | | |
|---|---|---|---|
| 3,128,639 | 4/1964 | Hein et al. | 74/572 |
| 3,283,864 | 11/1966 | Motsch | 192/70.27 |
| 3,456,499 | 7/1969 | South | 73/117.2 |
| 3,625,054 | 12/1971 | Vesper et al. | 73/116 |
| 3,813,931 | 6/1974 | Rennick et al. | 73/116 |
| 3,867,916 | 2/1975 | Bigalke | 123/117 R |

OTHER PUBLICATIONS

Vega Service Manual, Chevrolet, 1974 Edition, pp. 6-19.

*Primary Examiner*—George H. Krizmanich
*Attorney, Agent, or Firm*—Peter K. Kontler

[57] ABSTRACT

An ignition-operated combustion power unit wherein the flywheel on the crankshaft of the power unit can transmit torque to the pressure plate of a friction clutch whose cover carries an ignition point indicator. The cover can be connected to the flywheel in a single predetermined angular position of the cover and flywheel relative to each other so that the indicator is invariably maintained in one and the same angular position with reference to the crankshaft when the cover receives torque from the flywheel.

11 Claims, 4 Drawing Figures

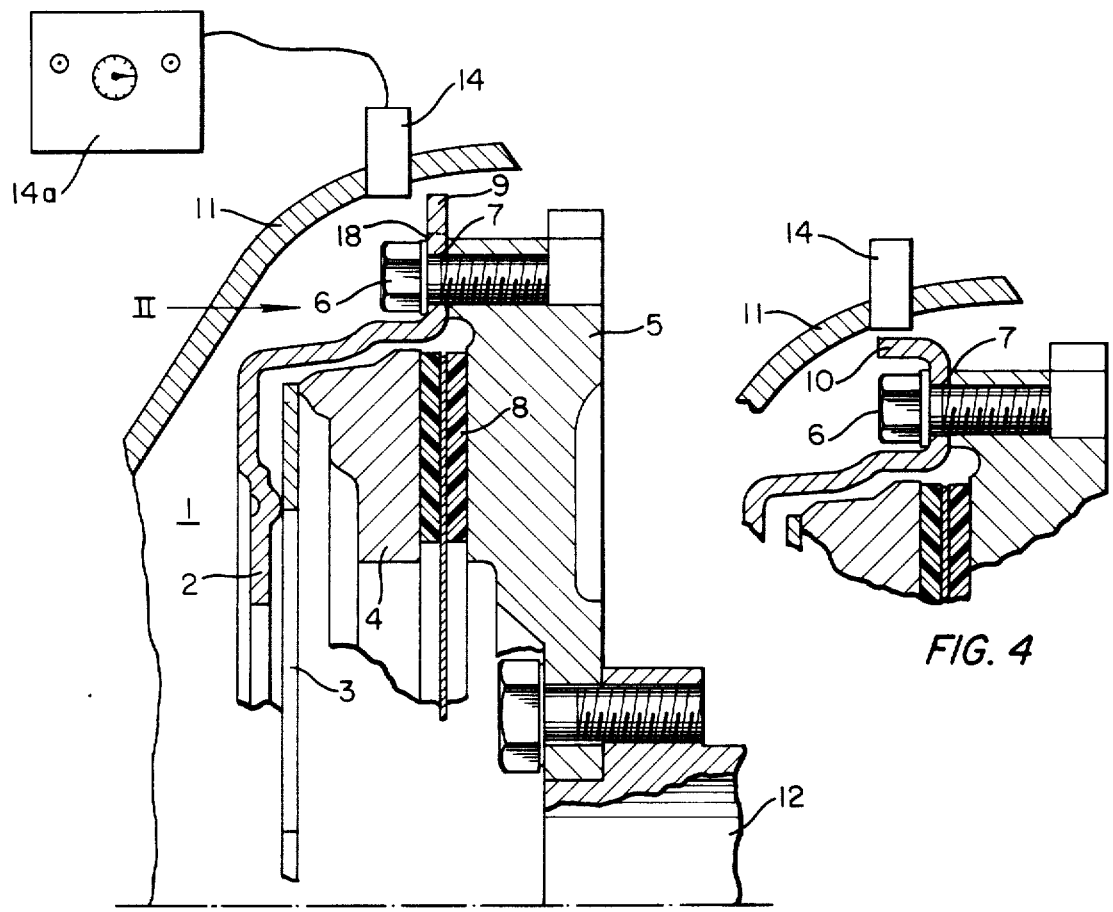
FIG. 1
FIG. 4
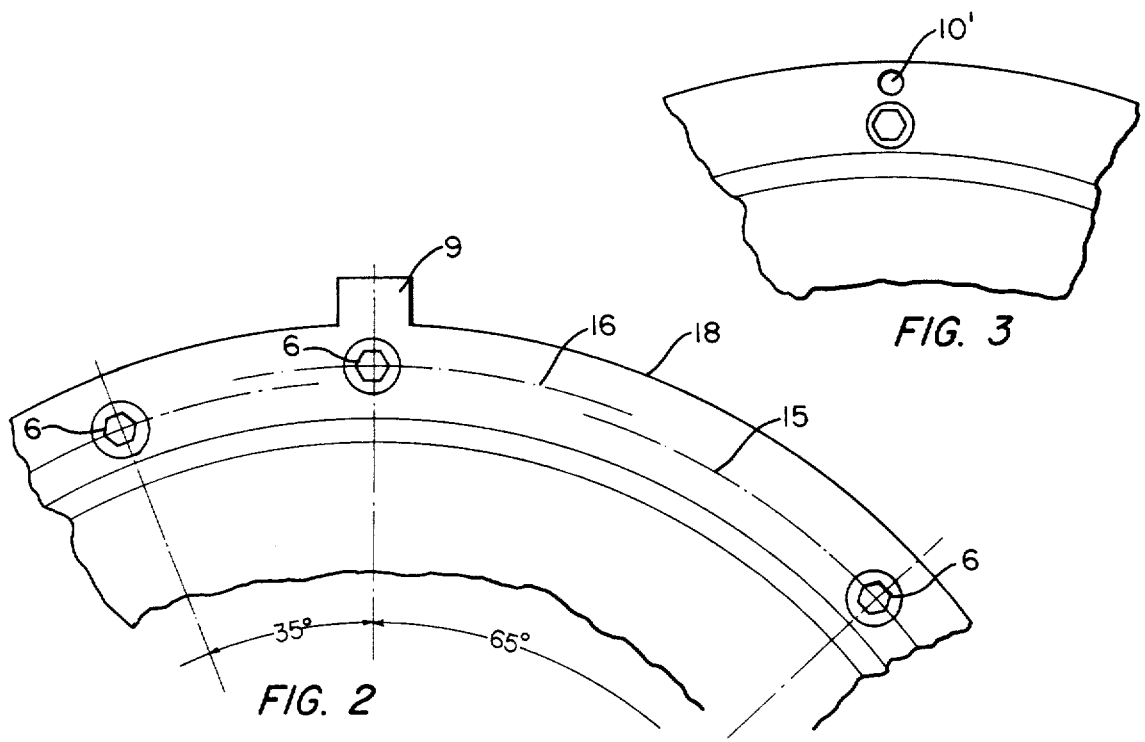
FIG. 3
FIG. 2

FRICTION CLUTCH

This is a continuation of co-pending patent application, Ser. No. 116,945, filed Jan. 30, 1980, now abandoned, which, in turn, is a continuation of co-pending application Ser. No. 847,805, filed Nov. 2, 1977, now abandoned.

The invention relates to a friction clutch, especially for motor vehicles, to be linked to a driven member, such as a flywheel, of an internal combustion machine.

Adjustment of the ignition point in an internal combustion machine can be effected, for example, with the aid of a marking provided at the flywheel of the internal combustion machine. Especially for the use with so-called diagnostic test stands or benches, it is known to provide a pin in the flywheel at a selected location thereof which, when traveling by during the rotation of the flywheel, provides a signal or a pulse which is comparable to the ignition point. The introduction of such a pin, which can extend outwardly from the flywheel in axial direction and can also as well project in radial direction beyond the diameter of the flywheel, is quite expensive to start with. Then, difficulties occur, especially if the diameter of the clutch that is to be assembled or mounted on the flywheel disc is at least nearly equal in size to that of the flywheel. In such cases, a marking could, indeed, be provided in the form of a pin projecting in radial direction, however, due to the high centrifugal-force effects, this pin must be threadedly secured. On the other hand, such a marking pin or a marking journal could be disposed so as to project in axial direction, however, this presents difficulties, because then the fastening screws for fastening the clutch to the flywheel exert a disturbing influence upon the indicator. The length of the pin is again limited, on the other hand, by the room or space available in the clutch bell of the transmission. A further possibility would be afforded by increasing the diameter of the flywheel and inserting a pin extending in axial direction into this increased diameter region, a possibility which would thus require a considerable expense.

It is accordingly an object of the invention to provide a friction clutch wherein an especially simple and economical marking may be effected which affords a trouble-free possibility of ignition-point adjustment even when minimal spatial or room conditions are available.

With the foregoing and other objects in view, there is provided, in accordance with the invention, a friction clutch having means forming a marking for ignition timing. This marking is either a so-called positive marking i.e. formed by projecting part, or is a so-called negative marking in the friction clutch.

In accordance with another feature of the invention, the marking means are provided on the cover or housing of the friction clutch, and can, in fact, be an integral part of the clutch cover, such as, for example, a nosepiece stamped or bent out from a sheet-metal cover, or the marking constitute an inserted or attached pin or the like.

In accordance with a further feature of the invention, the marking means is a projection extending beyond the outer diameter of the cover and/or of the flywheel and/or in the axial direction without requiring additional axial or radial construction space.

Heretofore, bores or openings formed in the cover or housing of friction clutches for linking the latter to the flywheel by means of fastening screws or bolts were provided symmetrically or at equal spacing from one another. In accordance with an additional feature of the invention, there is provided a combination of a flywheel and a friction clutch wherein the friction clutch includes a clutch cover, and means are included for threadedly securing the cover to the flywheel, the securing means comprising fastening screws extending through bores formed in the clutch cover, the bores being disposed asymmetrically to one another. Thereby, in an especially simple manner, the correct position of the clutch together with the marking means with respect to the crankshaft of the internal combustion machine is ensured.

In accordance with a further feature of the invention, the marking means also serves as a detecting member for a diagnosis indicator, for which, as detecting member, for example, also such marking means of permanent magnetic or with permanent magnetic material is used.

Other features which are considered as characteristic of the invention are set forth in the appended claims.

The invention is not intended to be limited to the details shown, since various modifications may be made therein without departing from the spirit of the invention and from the scope and range of equivalents of the claims.

The invention, however, together with additional objects and advantges thereof will be best understood from the following description when read in connection with the accompanying drawing, in which:

FIG. 1 is a partly sectional and partly side-elevational view of one half of a friction clutch which is constructed in accordance with the invention;

FIG. 2 is a fragmentary view of FIG. 1 as seen in direction of the arrow II and showing part of the cover of the friction clutch;

FIG. 3 is a fragmentary view similar to that of FIG. 2 but showing a modified construction of the friction clutch; and FIG. 4 is a fragmentary view similar to that of FIG. 1 but showing another embodiment of the friction clutch of the invention;

Referring now to the drawing and first, to FIG. 1, there is shown a friction clutch 1 according to the invention, having a cover 2, a plate or cup spring 3 engaging the cover 2, and a pressure plate 4 in pressure-applying contact with the plate spring 3 near the periphery thereof. Further shown in FIG. 1 is a flywheel 5 of a combustion power unit to which the cover 2 is fastened by screws 6 (see also FIG. 2) extending through corresponding openings or bores 7 formed in the cover 2. A clutch disc 8, disposed between the flywheel 5 and the pressure plate 4, is diagrammatically illustrated in FIG. 1.

From FIG. 1, it is readily apparent that the diameter of the flywheel 5 is at least nearly equal in size to the diameter of the clutch. The cover 2 has an extension 9 which projects beyond the diameter of the edge of the clutch or also the diameter of the flywheel 5 and which provides a marking for ignition or injection timing. The extension 9 may be formed of permanent magnetic material and serve as a detecting member for a non-illustrated diagnosis indicator. As shown in FIG. 4, the marking for ignition or injection timing can constitute a bent or angled-away nosepiece 10. Instead of the foregoing positive markings, a negative marking or hole 10' may be formed in the clutch 1, as shown in FIG. 3.

It is apparent that such a construction or disposition of a marking does not require any additional axial or radial room or space so that no changes in the clutch bell 11 of the transmission housing are required.

To effect a properly or correctly positioned assembly of the clutch and, accordingly, of the marking with respect to the crankshaft 12, the bores 7 formed in the cover 2 can be located asymmetrically to one another. This is shown in FIG. 2 wherein the distance between the central bolt or screw 6 and the left-hand bolt is less than the distance between the central bolt and the right-hand bolt.

There is claimed:

1. In a power unit, particularly in an ignition-operated combustion power unit, the combination of a rotary crankshaft; a flywheel on said crankshaft, said flywheel having a friction surface; a friction clutch adjacent to said flywheel and including a cover provided with a single marker constituting an ignition point indicator, resilient means between said cover and said flywheel, a pressure plate interposed between said resilient means and said flywheel and having a friction surface facing the friction surface of said flywheel, and a clutch disc between said friction surfaces; and cooperating torque transmitting means provided on said cover and said flywheel for connecting said cover with said flywheel in a single predetermined angular position relative to each other so that said marker is invariably maintained in one and the same predetermined angular position with reference to said crankshaft and said flywheel whenever said torque transmitting means connects said cover and said flywheel to each other.

2. The combination of claim 1, wherein said marker is a positive marker extending beyond the outline of the remainder of the clutch.

3. The combination of claim 1, wherein said marker is a negative marker.

4. The combination of claim 1, wherein said marker is an integral part of said cover.

5. The combination of claim 1, wherein said marker is a projection extending beyond said cover.

6. The combination of claim 1, wherein said clutch is coaxial with said flywheel and said marker extends radially beyond said flywheel.

7. The combination of claim 1, wherein said marker is the detecting member of a diagnosis indicating device.

8. The combination of claim 1, wherein the diameter of said flywheel matches or approximates the diameter of said clutch.

9. A friction clutch for an ignition-operated combustion power unit of the type having a crankshaft and a flywheel, said flywheel having a friction surface and being mounted on the crankshaft and being arranged to support the clutch, the clutch comprising a cover, resilient means between said cover and said flywheel, a pressure plate interposed between said resilient means and said flywheel and having a friction surface facing the friction surface of said flywheel, a clutch disc between said friction surfaces and a single means, as considered in the circumferential direction of the flywheel, which is provided on said cover and constitutes an ignition point indicating marker, the clutch and the flywheel being provided with cooperating torque transmitting means for permitting the mounting of the clutch and its marker on the flywheel only and alone in a predetermined single position of the clutch with reference to the positions of the crankshaft and the flywheel.

10. The friction clutch of claim 9, wherein said cover consists of sheet metal.

11. In a power unit, particularly in an ignition-operated combustion power plant, the combination of a rotary crankshaft; a flywheel on said crankshaft, said flywheel having a friction surface; a friction clutch adjacent to said flywheel and including a cover provided with a single marker constituting an ignition point indicator, resilient means between said cover and said flywheel, a pressure plate interposed between said resilient means and said flywheel and having a friction surface facing the friction surface of said flywheel, and a clutch disc between said friction surfaces; and torque transmitting means for connecting said cover with said flywheel so that said marker is maintained in a predetermined angular position with reference to said crankshaft and said flywheel, said cover having holes and said connecting means including threaded members extending through said holes and meshing with said flywheel, at least some of said holes being asymmetrical relative to one another so that said flywheel and said cover can be assembled only in said predetermined angular position of said marker with reference to said crankshaft and said flywheel.

* * * * *